(12) United States Patent
Kataoka et al.

(10) Patent No.: US 7,613,725 B2
(45) Date of Patent: Nov. 3, 2009

(54) SYSTEM FOR ASSISTING INPUT OF DATES IN DATA PROCESSING SYSTEM

(75) Inventors: Katsuhisa Kataoka, Kanagawa-ken (JP); Kenji Kobayashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 11/874,399

(22) Filed: Oct. 18, 2007

(65) Prior Publication Data
US 2008/0098324 A1    Apr. 24, 2008

(30) Foreign Application Priority Data
Oct. 20, 2006    (JP) .............................. 2006-286359

(51) Int. Cl.
   G06F 17/30    (2006.01)
   G06F 3/033    (2006.01)
(52) U.S. Cl. ...................................... 707/102; 715/780
(58) Field of Classification Search ....................... None
   See application file for complete search history.

(56) References Cited

U.S. PATENT DOCUMENTS

| | | | | |
|---|---|---|---|---|
| 5,806,067 A * | 9/1998 | Connor | ........................ | 707/100 |
| 6,334,030 B1 * | 12/2001 | Mizumo et al. | ............. | 396/310 |
| 6,446,067 B2 * | 9/2002 | Togawa | ........................... | 707/6 |
| 6,721,752 B1 * | 4/2004 | Kislanko | ...................... | 707/101 |
| 7,051,036 B2 * | 5/2006 | Rosnow et al. | ............... | 707/102 |
| 7,194,695 B1 * | 3/2007 | Racine et al. | ................ | 715/780 |
| 7,426,714 B1 * | 9/2008 | McCormack | ................ | 717/114 |
| 2001/0012008 A1 * | 8/2001 | Hongawa | ..................... | 345/418 |
| 2002/0123954 A1 * | 9/2002 | Hito | ............................ | 705/36 |
| 2003/0163464 A1 * | 8/2003 | Gopalan | ......................... | 707/6 |
| 2006/0067759 A1 * | 3/2006 | Osaka | ......................... | 399/366 |
| 2006/0129929 A1 * | 6/2006 | Weber et al. | ................. | 715/538 |
| 2007/0083486 A1 * | 4/2007 | Bloch et al. | .................... | 707/1 |

FOREIGN PATENT DOCUMENTS

| JP | 07-105290 | 4/1995 |
|---|---|---|
| JP | 2000-010697 | 1/2000 |
| JP | 2005-063037 | 10/2005 |

OTHER PUBLICATIONS

Mastering Microsoft Excel 2002, Sybex Inc. Copyright Jul. 27, 2001.*

* cited by examiner

*Primary Examiner*—Neveen Abel Jalil
*Assistant Examiner*—Tarek Chbouki
(74) *Attorney, Agent, or Firm*—Shimokaji & Associates, P.C.; Andre Gibbs

(57) ABSTRACT

Assisting the computer input of date values includes storing a pre-specified reference date in a storage device, storing one or more user-inputted digits in the storage device, complementing the input digit sequence with a digit sequence generated on the basis of the reference date, and displaying the one or more generated candidate dates on the display device.

5 Claims, 12 Drawing Sheets

FIG. 4

| MERCHANDISE | QUANTITY | DELIVERY DATE |
|---|---|---|
| ITEM A — 410 | 15 — 420 | 2006/10/01 — 430 |
| ITEM B — 410 | 10 — 420 | YYYY/MM/DD — 430 |
| ITEM C — 410 | 10 — 420 | YYYY/MM/DD — 430 |

400

FIG. 8
1000
(INITIAL STATE) REFERENCE DATE
1001
2006 / 10 / 25
DATE FIELD
1002 — YYYY / MM / DD
(OPERATION 1)
1004
2006 / 10 / 25
INPUT "1"
1003 — 1
1005 — 2006 / 10 / 2
+1
1006 — 2006 / 10 / 
(OPERATION 2)
1008
2006 / 10 / 25
INPUT "0"
1007
1009 — 2006 / 10 / 10
+1
1010 — 2006 / 1/ 10

SYSTEM FOR ASSISTING INPUT OF DATES IN DATA PROCESSING SYSTEM

TECHNICAL FIELD

The present invention generally relates to user interfaces. In particular, the present invention relates to a system for assisting the input of dates in a data processing system.

BACKGROUND OF THE INVENTION

Some business programs that operate on data processing systems prompt users to input dates depending on the specific programs and needs of the business. Recently, input of dates using a GUI (Graphical User Interface), such as by displaying a calendar on a date input screen and allowing users to select a date on the calendar with a mouse or the like, has been increasing. However, due to size restrictions on screens and monitors, an advantage of direct input of dates with a keyboard still exists.

When inputting a date (e.g., "2006/10/12") with a keyboard, users are required to input an 8-digit number. To reduce user work, techniques for allowing an omission of input of part of a date (e.g., "year") at the time of input of the date have been developed. Conventional techniques, such as those cited below, exist.

Japanese Unexamined Patent Application Publication No. 2005-63037 discloses a technique that permits omitting the input of "year" regarding items sorted in ascending order with respect to dates in an electronic procurement system.

Japanese Unexamined Patent Application Publication No. 2000-10697 determines an input range of dates on the basis of the current date, and that specifies the date corresponding to the "day" selected from the range.

Japanese Unexamined Patent Application Publication No. 7-105290 discloses a an input range that prevents form data input errors by presetting form data types (e.g., a type regarding whether to input a past date or a future date for the items), and by denying registration of the data if data different from the preset data types is input.

In conventional techniques described above, an omission of input of "year" or "year and month" of a date is realized by complementing "month and day" or "day" input by users with predetermined "year" or "year and month", respectively, under given conditions. These conventional techniques require at least "day" to be input fully, and to be fixed. For example, when a user intends to input a date "2006/10/12", the complementation operation is not performed until the user inputs "12" for day, and then presses the "Enter" key lo fix the input. Thus, if the complementation operation can be performed without fixing the input after inputting "day" in a complete form, that is, for example, if the complementation operation can be performed after the input of "1" or "2" in the above example, more efficient date input becomes available.

In addition, the conventional techniques are difficult for users to understand and predict the results. This is mainly due to the fact that the complemented date is not displayed to the users until the users fix the input numerals.

Displaying of a result of a complementation operation before a user fixes the input numerals allows the user to perform more efficient date input, while predicting the processing of the complementation operation

SUMMARY OF THE INVENTION

A method is disclosed for assisting the user input of dates in a data processing system. This method includes the storing of a pre-specified date in a storage device as a reference date. Then, in response to a user's input of a digit sequence of one or more digits in a date field displayed on a display device, storing the input digit sequence in the storage device, calculating the number of digits of tile input digit sequence and comparing the number of digits with the number of digits permitted for a date field, on condition that the calculated number of digits of the digit sequence is smaller than the number of digits permitted for the date field, generating one or more candidate dates by complementing the input digit sequence with a digit sequence generated on the basis of the reference date, and displaying the one or more generated candidate dates on the display device.

Preferably, generating the one or more candidate dates may further include acquiring a digit sequence representing the reference date from the storage device, extracting a digit sequence of a number of digits, equivalent to a value obtained by subtracting the number of digits n of the input digit sequence from the number of digits m permitted for the date field, from the digit sequence representing the reference date, and generating the one or more candidate dates by concatenating the extracted digit sequence to the input digit sequence.

Preferably, on condition of specifying that a generated candidate date should be after the reference date for the date field, the method may further include steps of determining whether or not the generated candidate date is after the reference date, and, if the candidate date is not after the reference date, incrementing a value at the (m-n)th digit of the digit sequence representing the candidate date to generate a new candidate date until the new candidate date becomes after the reference date. This allows the candidate date to be complemented and generated so as to be after the reference date for the date field to which a date after the predetermined reference date should be input.

Preferably, on condition of specifying that a generated candidate date should be before the reference date for the date field, the method may further include steps of determining whether or not the generated candidate date is before the reference date, and, if the candidate date is not before the reference date, decrementing a value at the (m-n)th digit of the digit sequence representing the candidate date to generate a new candidate date until the new candidate date becomes before the reference date. This allows the candidate date to be complemented and generated so as to be before the reference date for the date field to which a date before the predetermined reference date should be input.

Preferably, the method may further include steps of determining whether or not the generated candidate date is valid as a date, and, if the candidate date is not valid as a date, displaying that a valid date cannot be generated on the display device. This can prevent user input errors.

Furthermore, preferably, the method may further include steps of determining whether or not the generated candidate date is valid as a date, and, if the candidate date is not valid as a date, generating a new candidate date by performing a complementation operation again on a digit sequence obtained by shifting the input digit sequence by one or more digits in the date field. This presumes that the digit sequence input by the user is a valid date, and presents as many valid dates as possible.

As described above, the summary of the present invention has been described for a method for assisting the input of dates in a data processing system. However, the present invention can be also interpreted as a data processing system, a program, and a program product. The program product includes, for example, a recording medium storing the program, and media for delivering the program.

In the above-described summary of the invention, it should be noted that not all of the features of the present invention are necessary for operation; combinations of these features or subcombinations thereof may also constitute the invention.

BRIEF DESCRIPTION OF THE DRAWINGS

FIG. 4 is an example of a data input screen of a business program including a date field according to an embodiment of the present invention.

FIG. 8 is a diagram showing an example of a complementation operation performed for a date field to which a date after a reference date should be input according to an embodiment of the present invention.

DETAILED DESCRIPTION

Figure 1:
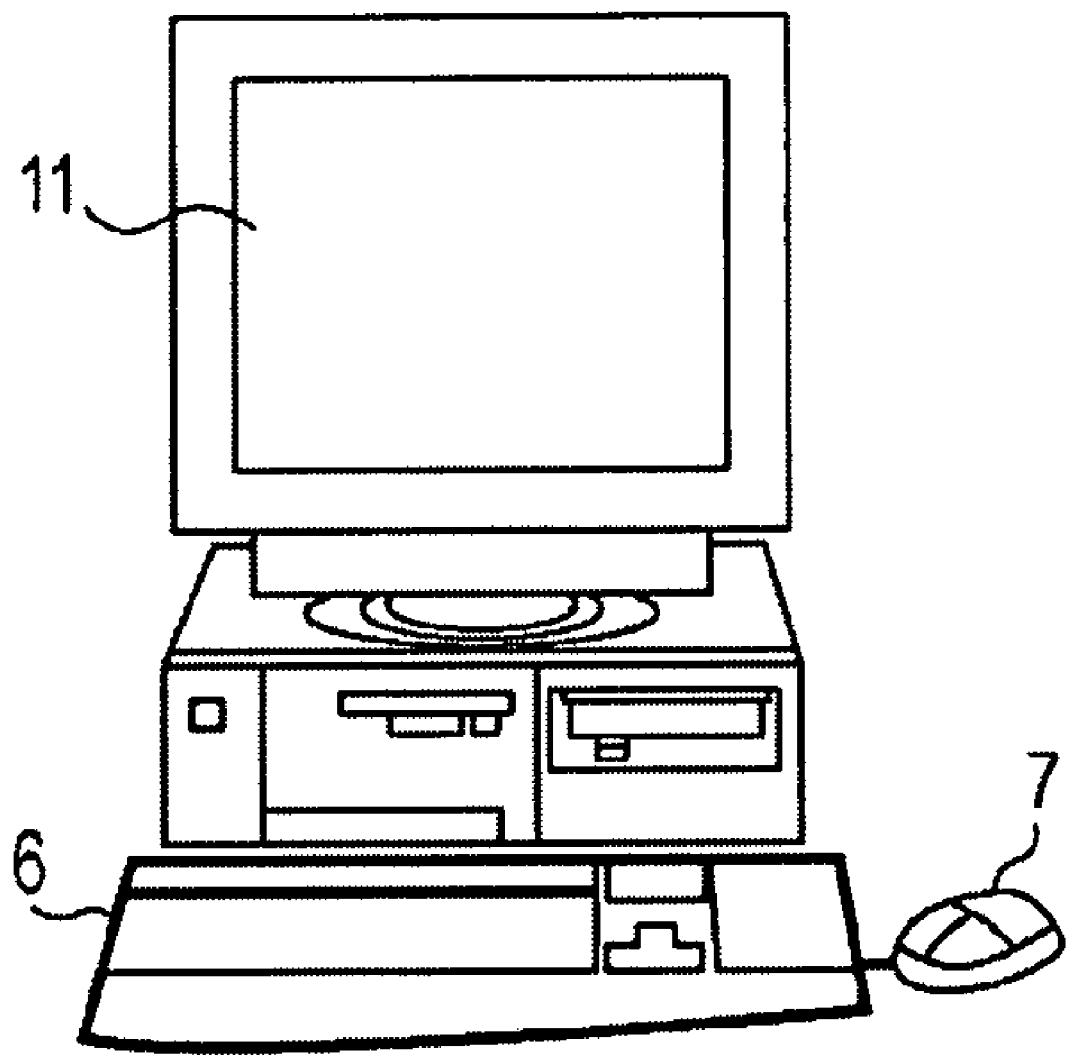
FIG. 1 is a diagram showing an example of an external appearance of a data processing system according to an embodiment of the present invention.

In the following, preferred embodiments of the present invention are described on the basis of the drawings. However, the embodiments given below do not limit the present invention defined by the claims.

The present invention can be embodied in a variety of different forms, and should not be limitedly to tile embodiments described. Like elements are denoted in the drawings by similar reference numerals throughout the description of the embodiments.

FIG. 1 is an example of a data processing system 100 according to an embodiment of the present invention. The data processing system 100 according to the preferred embodiment of the invention includes a keyboard 6, a mouse 7, and a display device 11.

The display device 11 of the data processing system 100 visually displays operation progress information or the like to users. Users input necessary data in various data input fields displayed on the display device 11 by business programs using input devices, such as the keyboard 6 and the mouse 7. The data input fields include a "date field" to which a given date is input by a user.

Figure 2:
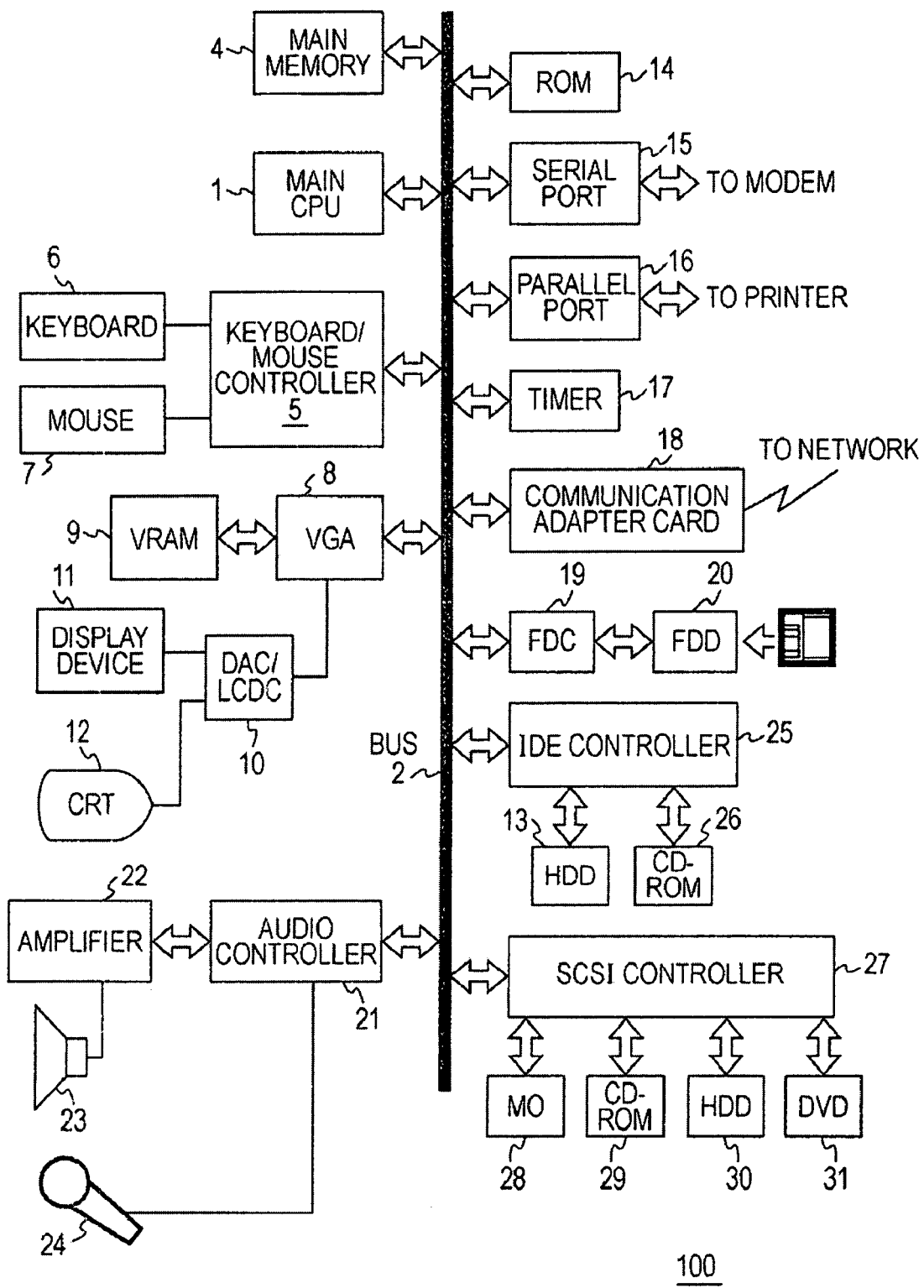
FIG. 2 is a diagram showing an example of a hardware configuration of an information processing device preferable for realizing a data processing system according to an embodiment of the present invention.

FIG. 2 is a diagram showing an example of a hardware configuration of an information processing device preferable for realizing the data processing system 100 according to an embodiment of the present invention. The information processing device includes a CPU (Central Processing Unit) I and a main memory 4, which are connected to a bus 2. Removable storage drives (i.e., external storage systems allowing exchange of recording media), such as hard disk drives (HDD) 13 and 30, CD-ROM (Compact Disk-Read Only Memory) drives 26 and 29, a flexible disk drive (FDD) 20, an MO (Magneto-Optical Disk) drive 28, a DVD (Digital Versatile Disk) drive 31, are connected to the bus 2 through a flexible disk controller (FDC) 19, an IDE (Integrated Drive Electronics) controller 25, and a SCSI (Small Computer System Interface) controller 27.

Recording media, such as a flexible disk, an MO, a CD-ROM, and a DVD-ROM, are inserted into the removable storage drives. Computer program codes for carrying out the present invention that give instructions to the CPU or the like in cooperation with an operating system can be recorded on these recording media, the hard disk drives 13 and 30, and a ROM (Read Only Memory) 14. The computer programs are loaded to the main memory 4 and executed. The computer programs may be compressed or divided into a plurality of files, and then recorded on a plurality of media.

The information processing device receives input from input devices, such as the keyboard 6 and the mouse 7, through a keyboard/mouse controller 5. The information processing device is also connected, through a DAC/LCDC 10, to the display device 11 for providing visual data to users.

The information processing device is connected to a network through a network adapter 18 (e.g., an Ethernet® card or a token ring card), which permits the information processing device to communicate with other computers or the like. Although not shown, the information processing device can be connected to a printer through a parallel port 16, and to a modem through a serial port 15.

From the above description, it is easily understood that the information processing device preferable for realizing the data processing system 100 according to the embodiment of the present invention is implemented by information processing devices, such as a normal personal computer, a workstation, a mainframe, or combination thereof. However, these elements are illustrative only, and all of the elements are not necessarily needed for the present invention.

Various modifications may easily occur to those skilled in the art. For example, each hardware element of the information processing device used in the embodiment of the present invention is embodied by combining a plurality of machines and by distributing functions to those machines. Such modifications should be included in the spirit of the present invention.

The data processing system 100 employs operating systems that support GUI (Graphical User Interface), such as the Windows® operating system provided by Microsoft Corporation, Mac OS® provided by Apple Computer Incorporated, Unix® systems and similar systems that include the X Window System (e.g., AIX® or Linux® systems provided by International Business Machines Corporation).

As described above, it can be understood that the data processing system 100 used in the embodiment of the present invention is not limited to a specific operating system environment.

Figure 3:
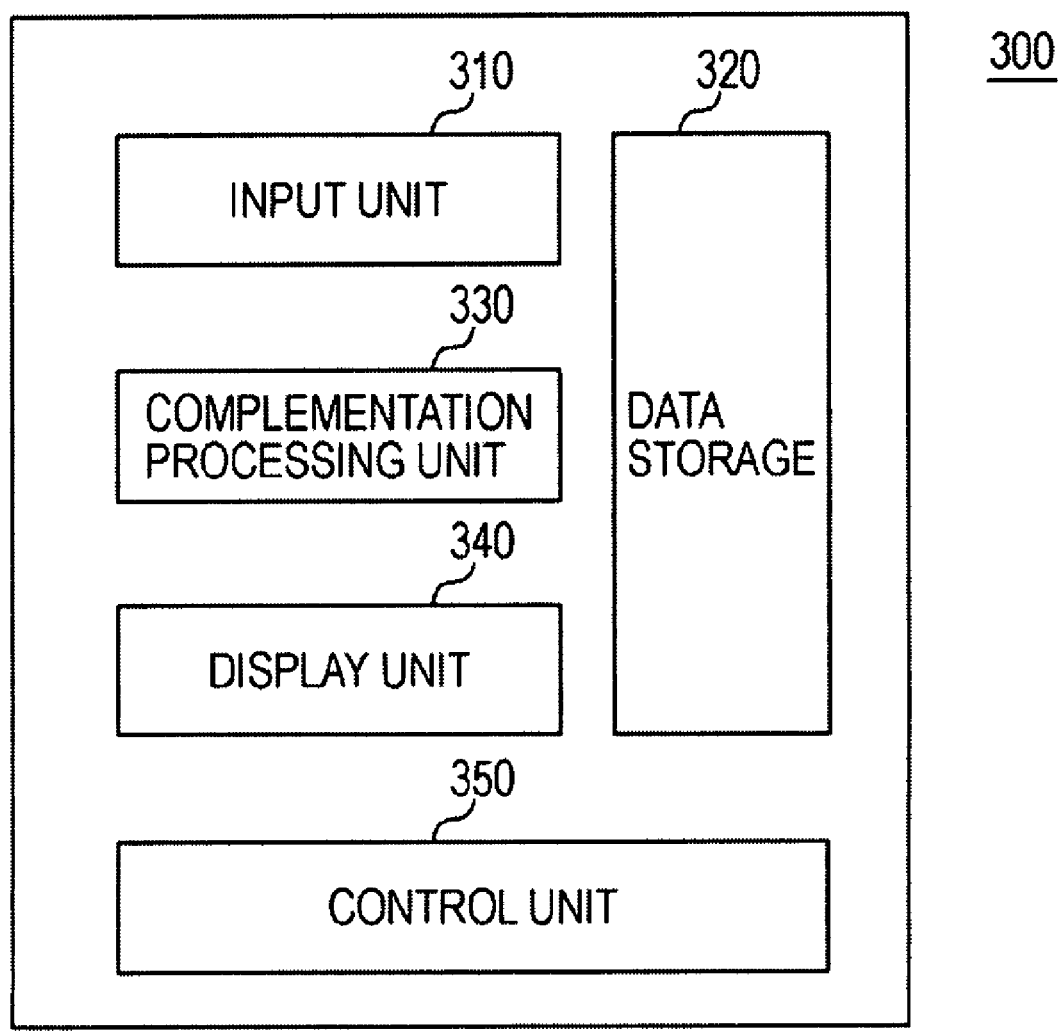
FIG. 3 is a functional block diagram of a system for assisting input of date according to an embodiment of the present invention.

FIG. 3 is a functional block diagram of a system 300 for assisting the input of dates in the data processing system 100 according to an embodiment of the present invention. In the information processing device having the hardware configurations illustrated in FIG. 2, an operating system and computer programs stored in the hard disk drive 13 or the like is loaded to the main memory 4, and the CPU 1 executes the operating system and the computer programs to cause the hardware resources and the software to work in cooperation, whereby each element shown in the functional block diagram of FIG. 3 can be realized.

The date input assist system 300 includes an input unit 310, a data storage 320, a complementation processing unit 330, a display unit 340, and a control unit 350. The input unit 310 receives a digit sequence that is input by a user with the keyboard 6 or the like in a date field provided for input of the date displayed on the displays device 11. The data storage 320 is realized by a storage device, such as the main memory 4. The data storage 320 stores the digit sequence input by the user in the date field and a reference date, which will be described later.

The complementation processing unit 330 calculates the number of digits of the date digit sequence input by the user. On condition that the calculated number of digits is less than the number of digits permitted for the date field, the complementation processing unit 330 generates a candidate for the date by complementing the digit sequence input by the user with a digit sequence generated on the basis of the reference date. Here, in case that a format of the date field is "YYYYMMDD" (where, YYYY, MM, and DD indicate "year", "month", and "day", respectively), the number of digits permitted for the date field is eight.

The display unit 340 displays the candidate of the date generated by the complementation processing unit 330 on the display device 11. The control unit 350 controls the input unit 310, the complementation processing unit 330, the data storage 320, and the display unit 340. Upon the input unit 310 receiving input from the user, the control unit 350 requests the complementation processing unit 330 to execute the complementation operation. The control unit 350 also requests the display unit 340 to display the result of date complementation.

FIG. 4 shows an example of a data input screen 400 of a business program that includes a date field according to an embodiment of the present invention. The data input screen 400 displays fields 410 provided for input of merchandise names, fields 420 provided for input of ordering quantities of the merchandise, and fields 430 provided for input of delivery dates. In this example, a date is input in a date field 430 in a right-aligned manner; for example. 20061001 might be input and displayed as "2006/10/01" as a delivery date of the merchandise "ITEM A".

Figure 5:
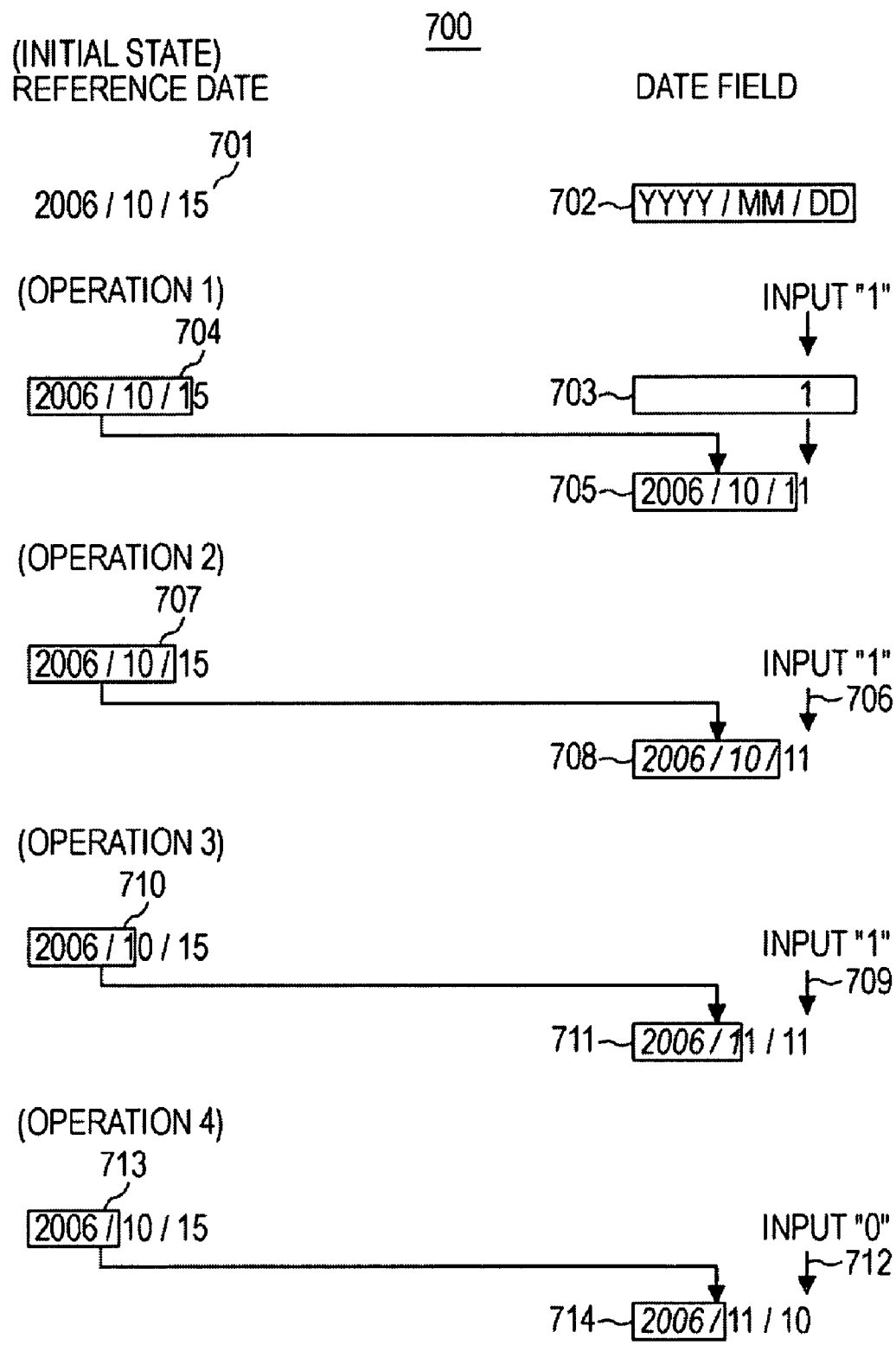
FIG. 5 is a diagram showing an example of a complementation operation performed in a date input assist system according to an embodiment of the present invention.

A specific example of the complementation operation will be described with reference to FIG. 5. FIG. 5 is a diagram showing an example of the complementation operation that is performed by the date input assist system 300 according to an embodiment of the present invention. In this example, a user attempts to input "2006/11/10" in the date field 430 provided for input of a delivery date of a merchandise "ITEM A" in FIG. 4. The user omits input of year, and sequentially inputs month and day. The date is input in the date field in a right-aligned manner according to an YYYY/MM/DD format (702). In addition, the reference date is specified to "2006/10/15" (701).

If the user input "1" in the date field with the first operation (703), the number of digits of the input digit sequence is equal to one. Since the number of digits is smaller than the number of digits permitted for the date field (i.e., eight), the complementation operation starts. The difference between the number of digits permitted for the input field and the number of digits of the input digit sequence is equal to seven. Thus, left seven digits (i.e., "2006101") of the digit sequence representing the reference date are extracted (704). The extracted digits are concatenated to the left side of the digit sequence input by the user (i.e., "1"). In this way) "2006/10/11" is generated as a candidate of the date, and displayed to the user (705).

However, since the displayed date is not the date intended by the user, the user inputs "1" again with the second operation. This causes the previously input "1" to be shifted by 1 digit to the left, and "11" to be input (706). Since the number of digits of the digit sequence input by the user is equal to two and is smaller than the number digits permitted for the date field (i.e., eight), the complementation operation starts. The difference between the number of digits permitted for the input field and the number of digits of the input digit sequence is equal to six. Thus, left six digits (i.e., "200610") of the digit sequence representing the reference date are extracted (707). The extracted digits are concatenated to the left side of the digit sequence input by the user (i.e., "11"). In this way, "2006/10/11" is generated as a candidate of the date, and is displayed (708).

However, the displayed candidate of the date is not still the date intended by the user. The user sequentially inputs "1" and "0" in a similar way (709 and 712). As a result, "2006/11/10" is generated as a candidate of the date, and is displayed to the user (714).

As described above, since the candidate of the date generated by the complementation operation is displayed each time the user inputs one numeral character the user can easily predict the complementation operation to be performed on their input. This allows the user to learn the processing of the complementation operation, and can decrease the number of input operations. A specific example thereof will be described using FIG. 6.

Figure 6:
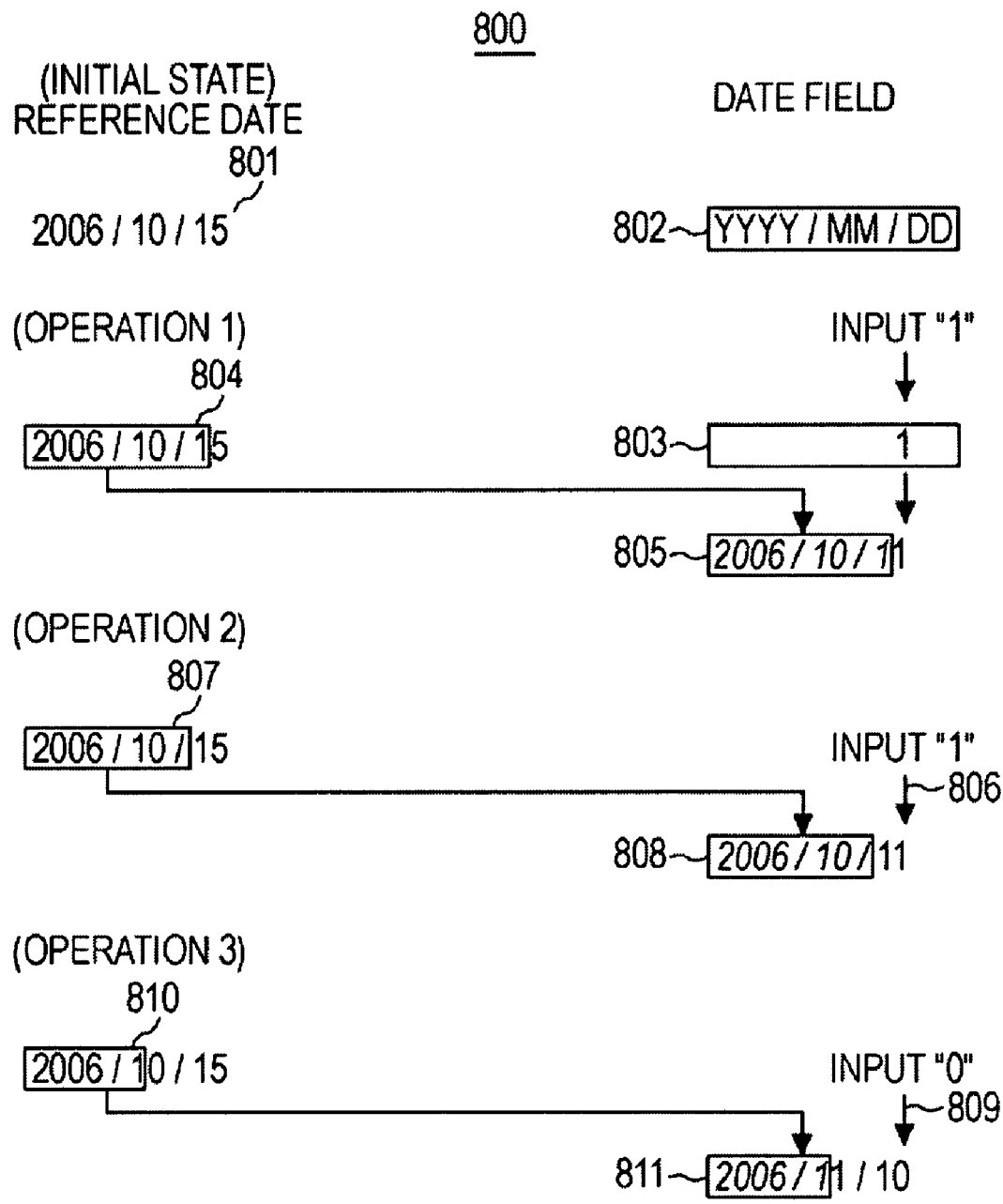
FIG. 6 is a diagram showing a case where a user that has learned processing of a complementation operation inputs a date according to an embodiment of the present invention.

FIG. 6 shows a case where the user that has learned the processing of the complementation operation inputs the date under a circumstance similar to the description of FIG. 5. The steps performed until "2006/10/11" is displayed after the user inputs "11" are similar to those described in FIG. 5 (801 to 808).

However, the user that has learned the processing from the displayed result of the complementation operation can then input "0" instead of "1" (809), because the user can predict that "1" will be complemented at the 4th digit from the right from the results of the complementation operations performed so far.

In response to a users input of "0" (809), the left five digits of the digit sequence representing the reference date (i.e., "20061") are extracted (810), and are concatenated to the left side of "110" input by the user. As a result, "2006/11/10" that the user attempts to input is generated as a candidate of the date, and displayed (811).

While the basic processing of the complementation operation according to an embodiment of the present invention has been described above, extended complementation operations will be described below. A date to be input may be limited depending on the meaning of the date to be input in the date field. For example, a delivery date or a payment due date should not be a past date. In addition, an actual result date should not be a future date. Processing of complementation operations performed for a date field to which a date after or before a specific date should be input will be described below.

Figure 7:
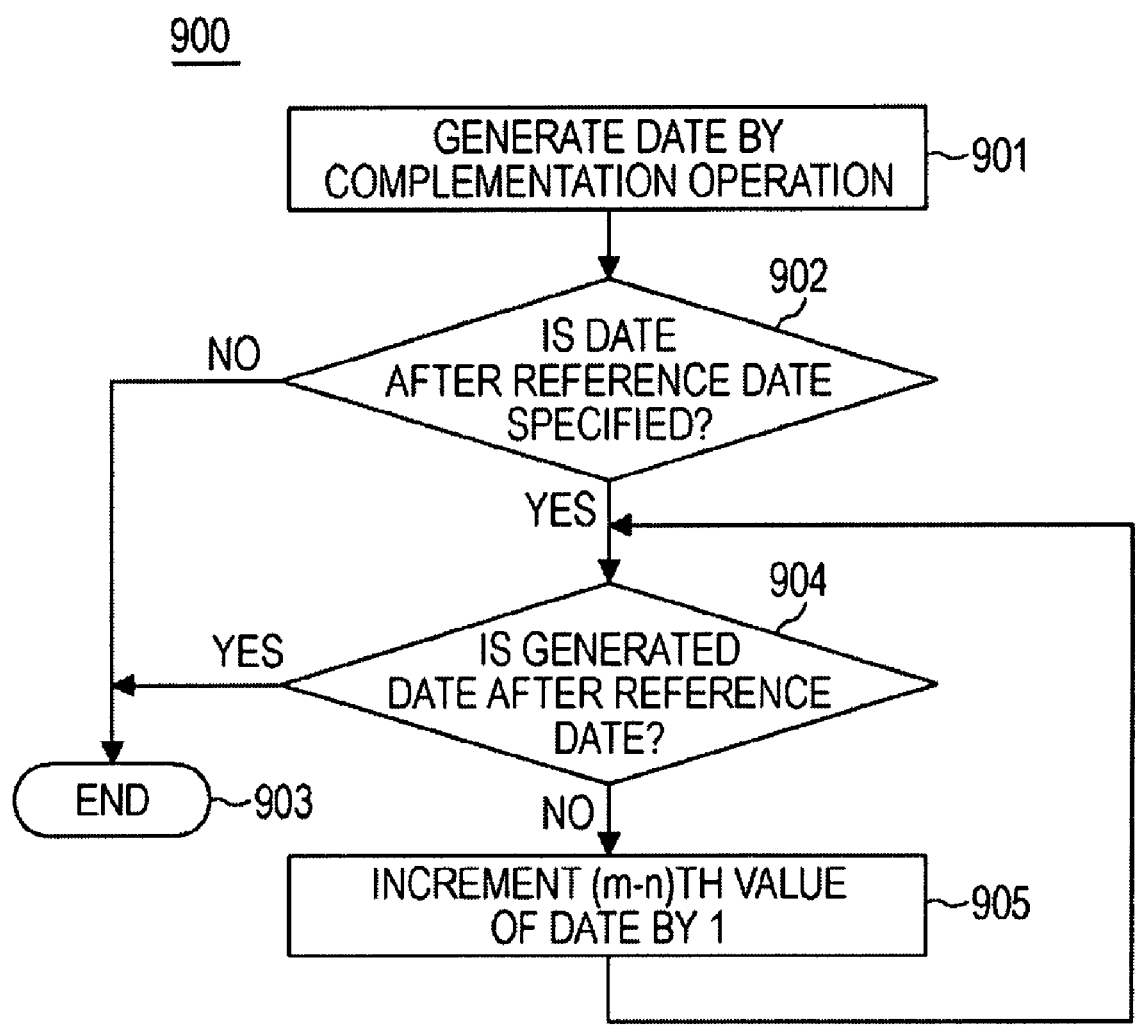
FIG. 7 is a flowchart showing a complementation operation performed for a date field to which a date after a reference date should be input according to an embodiment of the present invention.

FIG. 7 is a flowchart 900 showing a complementation operation performed for a date field to which a date after a reference date should be input according to an embodiment of the present invention. The operation starts with generating a candidate of a date by the above-described basic complementation operation at STEP 901. At STEP 902, it is determined whether or not input of a date after the reference date is specified for the date input field. This specification information can be stored in association with each date field in the data storage 320. If the input of the date after the reference date is not specified for the date field, the operation is terminated (STEP 903).

On the other hand, if the input of the date after the reference date is specified for the date field, the process proceeds to STEP 904. The generated candidate of the date is compared with the reference date to determine whether or not the candidate date is after the reference date (STEP 904). If the candidate date is after the reference date, the necessary condition is met. Accordingly, the operation is terminated (STEP 903).

If the candidate date generated at STEP 901 is not after the reference date, the process proceeds to STEP 905. At STEP 905, the value at the (m-n)th digit of the digit sequence representing the candidate date is incremented by one until the candidate date becomes after the reference date. Here, m represents the number of digits permitted for the date field, whereas n represents the number of digits of the digit sequence input by the user.

A specific example will be described with reference to FIG. 8. In this example, "2006/11/25" is specified as a reference date (1001), and a user attempts to input "2006/11/10" in a date field 1002. Firstly, the user inputs "1" (1003). Then, left seven digits of the digit sequence representing the reference date (i.e., "2006102") are extracted (1004), and are concatenated to the left side of the numeral character "1" input by the user. In this way, "2006/10/21" is generated (1005). Since "2006/10/21" is not after the reference date, the value at the (8-1)th (i.e., the seventh) digit from the left is incremented by one. As a result, "2006/10/31" is generated (1006). Since this date is after the e date, the operation is terminated.

However, since the generated candidate date is not the date that the user intended the user further inputs "0" (1007). Then, left six digits of the digit sequence representing the reference date (i.e., "200610") are extracted (1008), and are concatenated to the left side of the digit sequence "10" input by the user. In this way, "2006/10/10" is generated (1009). Since "2006/10/10" is not after the reference date, the value at the (8-2)th (i.e., the sixth) digit from the left is incremented by one. As a result, "2006/11/10" is generated (1010). Since this date is after the reference date, the operation is terminated, and this date is displayed to the user. Since this date is equivalent to the date that the user intended to input, the user finishes the input operation.

Figure 9:
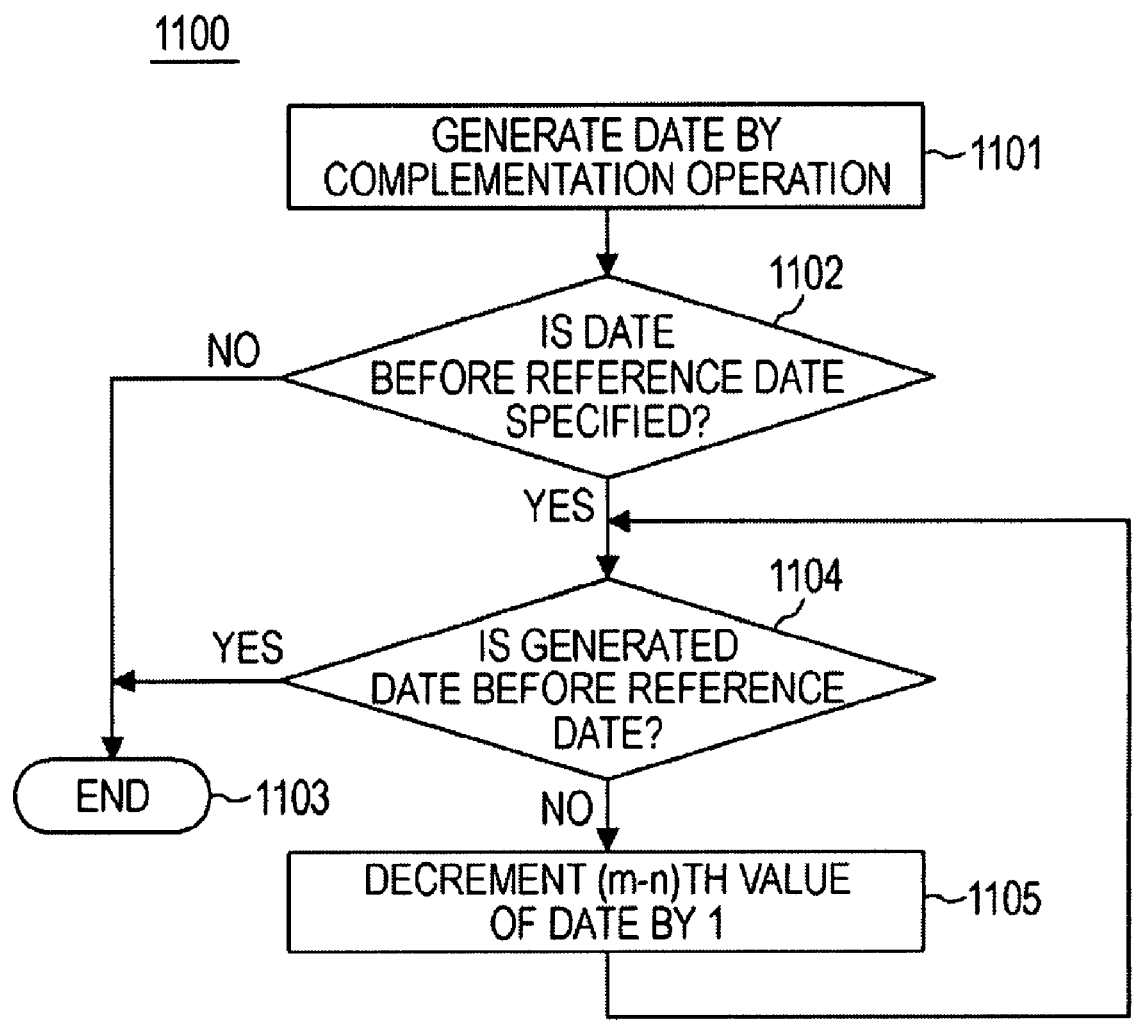
FIG. 9 is a flowchart showing a complementation operation performed for a date field to which a date before a reference date should be input according to an embodiment of the present invention.

A complementation operation performed for a date field to which a date before a reference date should be input will be described next with reference to FIG. 9. The operation starts with generating a candidate of a date by the above-described basic complementation operation at STEP 1101. At STEP 1102, it is determined whether or not input of a date before the reference date is specified for the date input field. If the input of the date before the reference date is not specified for the date field, the operation is terminated (STEP 1103).

On the other hand, if the input of the date before the reference date is specified for the date field, the process proceeds to STEP 1104. At STEP 1104, it is determined whether or not the candidate date generated at STEP 1101 is before the reference date. If the candidate date is before the reference date, the necessary condition is met. Accordingly, the operation is terminated (STEP 1103).

If the candidate date generated at STEP 1101 is not before the reference date, the process proceeds to STEP 1105. At STEP 1105, the value at the (m-n)th digit of the digit sequence representing the candidate date is decremented until the candidate date becomes before the reference date. Here, m represents the number of digits permitted for the date field, whereas n represents the number of digits or the digit sequence input by the user.

Figure 10:
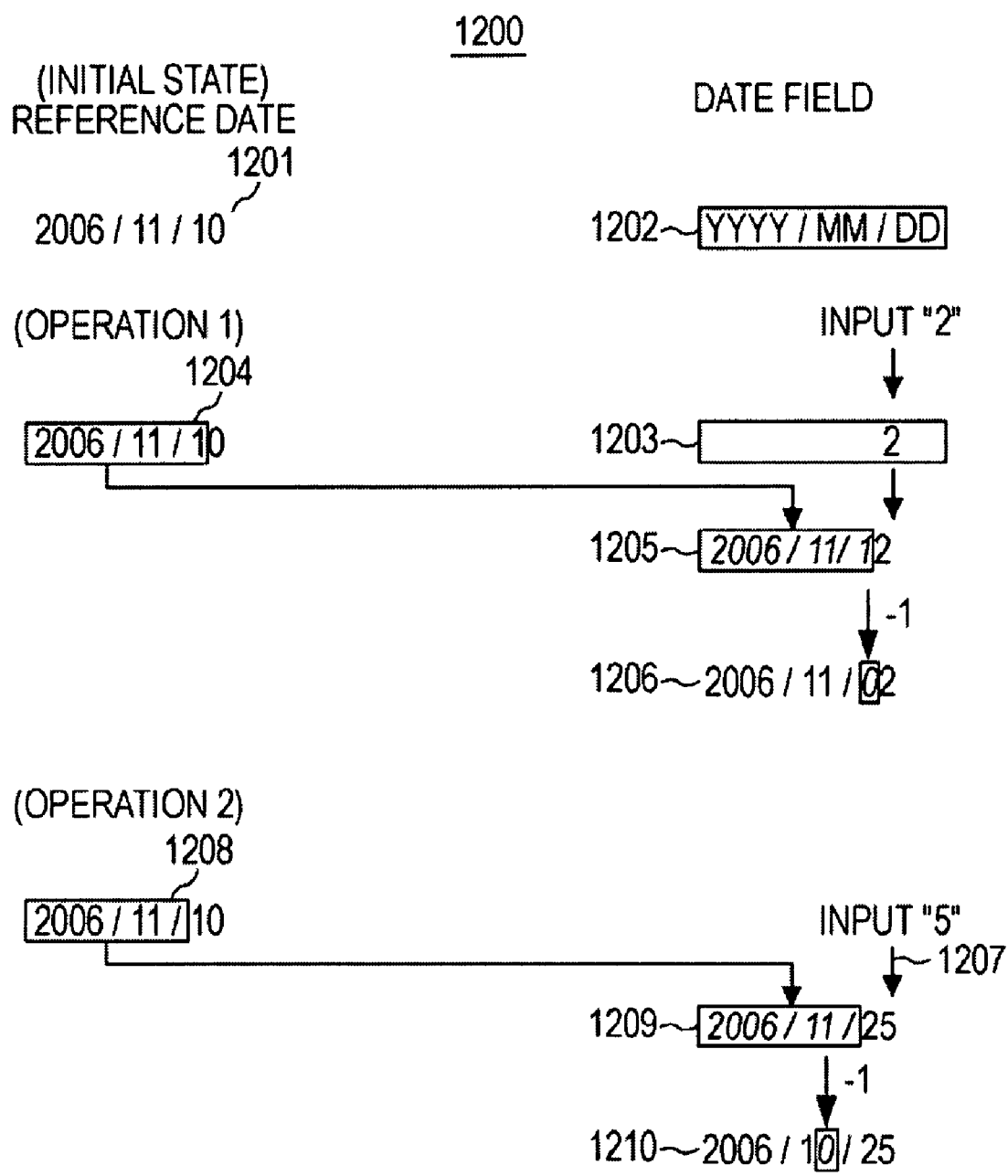
FIG. 10 is a diagram showing an example of a complementation operation performed for a date field to which a date before a reference date should be input according to an embodiment of the present invention.

A specific example sill be described with reference to FIG. 10. In this example, "2006/11/10" is specified as a reference date (1201), and a user attempts to input "2006/11/25" in a date field 1202. Firstly, the user inputs "2" (1203). Then, left seven digits of the digit sequence representing the reference date (i.e., "2006111") are extracted (1204), and are concatenated to the left side of the numeral character "2" input by the user. In this way, "2006/11/12" is generated (1205). Since "2006/11/12" is not before the reference date, the value at the (8-1)th (i.e., the seventh) digit from the left is decremented by one. As a result, "2006/11/02" is generated (1206). Since this date is before the reference date, the operation is terminated.

However, since the generated candidate date is not the date that the user intended to input, the user further inputs "5" (1207). Then, left six digits of the digit sequence representing the reference date (i.e., "200611") are extracted (1208), and are concatenated to the left side of the digit sequence "25" input by the user. In this way, "2006/11/25" is generated (1209). Since "2006/11/25" is not before the reference date, the value at the (8-2)th (i.e., the sixth) digit from the left is decremented by one. As a result, "2006/11/25" is generated (1210). Since this date is before the reference date, the operation is terminated. Additionally, since this date is equivalent to the date that the user intended to input, the user finishes the input operation.

Figure 11:
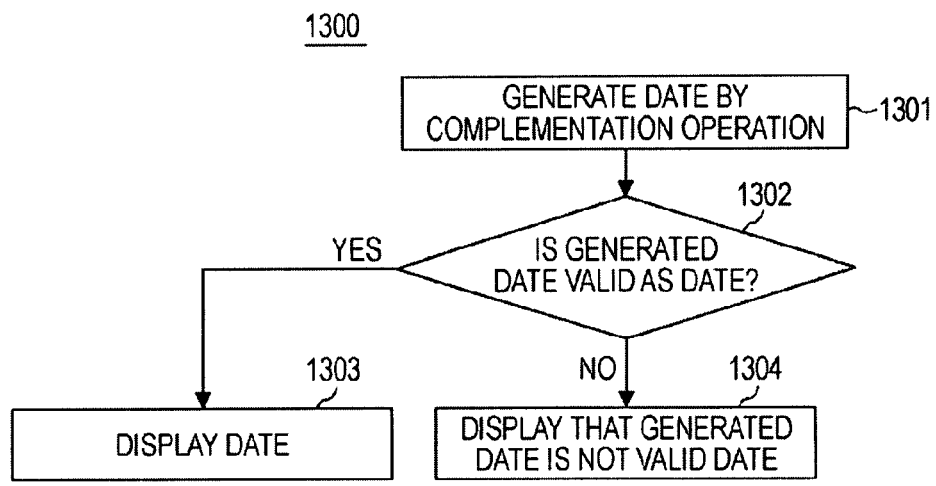
FIG. 11 is a flowchart showing basic processing performed when a candidate date generated by a complementation operation is not valid as a date according to an embodiment of the present invention.

Another extended complementation operation will be described next. There may be a case where the candidate date generated by performing the complementation operation on the basis of the digit sequence input by the user is not valid as a date. For example, the value representing "month" exceeds 12, or the value representing "day" becomes equal to 0. FIG. 11 shows a flowchart of basic processing of a complementation operation performed in such cases. The operation 1300 starts with generating a candidate of a date by the complementation operation at STEP 1301. At STEP 1302, it is determined whether or not the generated candidate date is valid as a date. If the generated date is valid as a date, the process proceeds to STEP 1303. At STEP 1303, the candidate date is displayed, and the operation is terminated. On the other hand, if the generated candidate date is not valid as a date, the process proceeds to STEP 1304. At STEP 1304, a message indicating that the generated date resulting from the complementation operation is not a valid date is displayed. To draw a user's attention, displaying of the message may be performed using an icon, or a color of the candidate date to be displayed may be changed.

Figure 12:
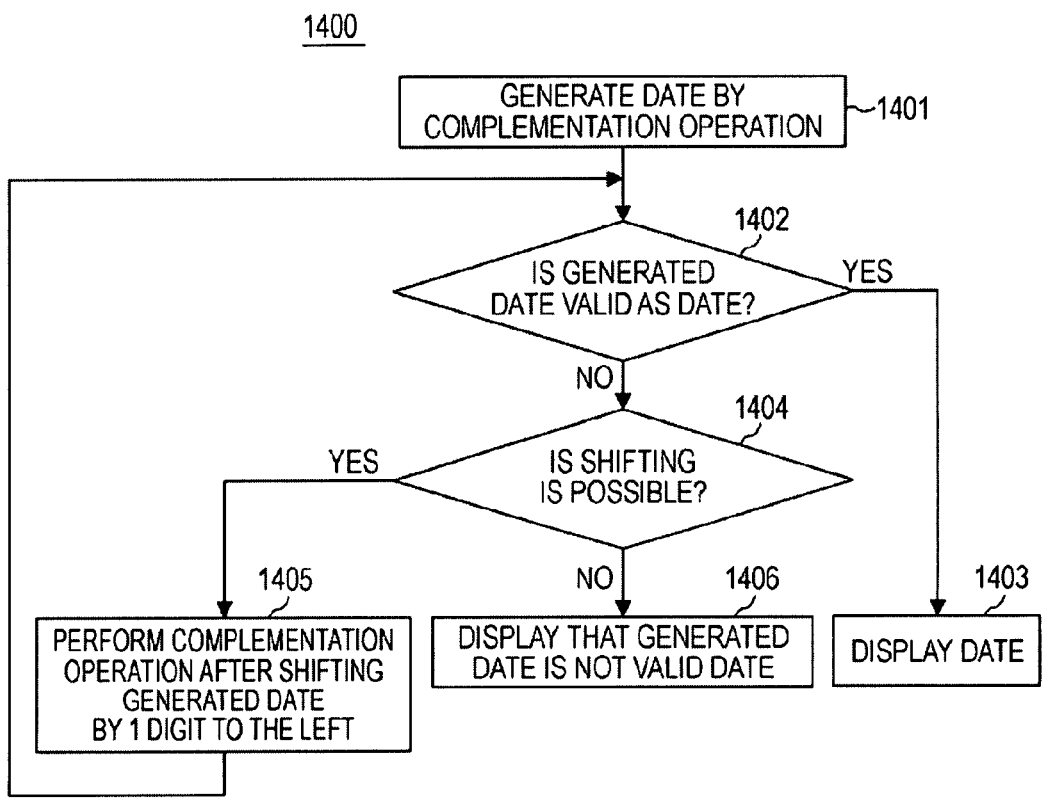
FIG. 12 is a flowchart showing another processing performed when a candidate date generated by a complementation operation is not valid as a date according to an embodiment of the present invention.

FIG. 12 is a flowchart showing another processing performed in case that the candidate date generated by performing the complementation operation is not valid as a date. The operation 1400 differs from that described in FIG. 11 in processing performed when the candidate date is not valid as a date. If the candidate date is not valid as a date at STEP 1402, the process proceeds to STEP 1404. At STEP 1404, it is determined whether or not the digit sequence input by the user can be shifted by one digit to the left in the input field without causing overflow. If the shifting is possible, the process proceeds to STEP 1405. At STEP 1405, the complementation operation is performed again after shifting the digit sequence by one digit to generate a candidate date. After that, the process returns to STEP 1402, and whether or not the generated candidate date is valid is determined. If the shifting cannot be performed at STEP 1404, the process proceeds to STEP 1406. At STEP 1406, a message indicating that the generated date resulting from the complementation operation is not a valid date is displayed.

Figure 13:
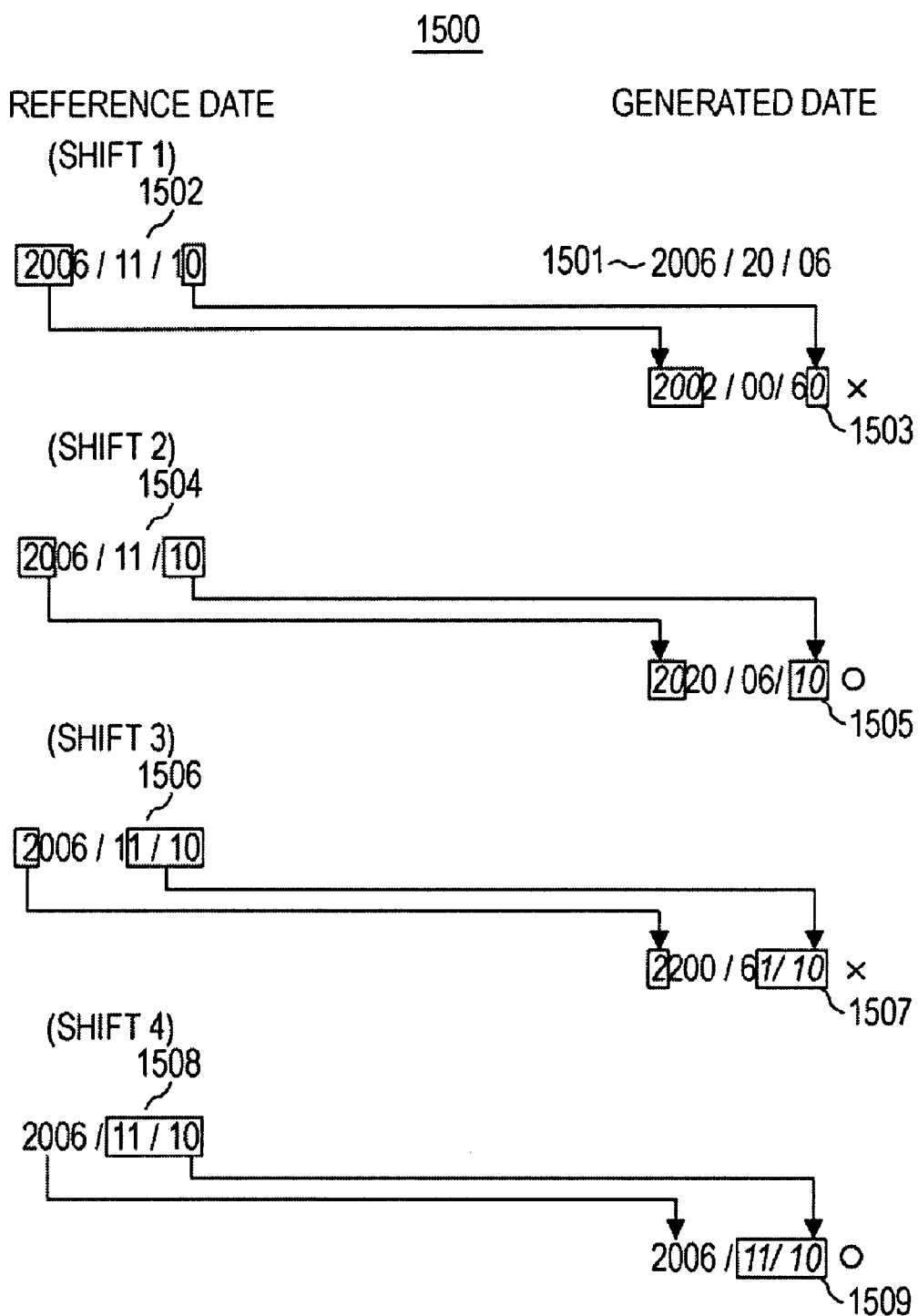
FIG. 13 is a diagram showing an example of another processing performed according to an embodiment of the present invention when a candidate date generated by a complementation operation is not valid as a date.

A specific example of this operation will be described with reference to FIG. 13. In this example, a user inputs "2006" in a date field, and a candidate date "2006/20/06" is generated as a result of the complementation operation (1501). This candidate date is not valid as a date since the value for "month" is 20. Thus, it is determined whether or not "2006" input by the user can be shifted. Since the number of digits of the digit sequence input by the user is four and the number of digits permitted for the input field is eight; the digit sequence can be shifted to the left by four digits at a maximum. Accordingly, the complementation operation is performed after the input digit sequence is shifted to the left by one digit.

The complementation operation is performed in the following manner. A digit sequence of a number of digits, equivalent to a value obtained by subtracting the number of digits n of the digit sequence input by the user and the number of shifted digits of the digit sequence from the number of digits permitted for the date field, are extracted from the digit sequence representing the reference date from the left. The extracted digit sequence is concatenated to the left side of the digit sequence input by the user. Furthermore, the digit sequence representing the reference date is extracted for the number of shifted digits of the digit sequence from the right, and is concatenated to the right side of the digit sequence input by the user. In this example, left three digits of the digit sequence representing the reference date are extracted, and are concatenated to the left side of the digit sequence input by the user. A right digit of the digit sequence representing the reference date is extracted, and is concatenated to the right side of the digit sequence input by the user. As a result, "2002/00/60" is generated.

However, "2002/00/60" is not valid as a dale since the value for "month" is 0, and the value for "day" is 60. Thus, the complementation operation is performed after shilling the digit sequence to the left by one digit. As a result, "2020/06/10" is generated (1505). Since "2006/06/10" is valid as a date, this candidate date is displayed. The operation may be terminated here. Alternatively, the operation may be configured to further generate a candidate date until the shifting becomes unavailable. In FIG. 13, the candidate date is generated until the digit sequence input by the user cannot be shifted in the date field. In case that the digit sequence is shifted to the left by three digits, "2200/61/10" is generated. However, this candidate date is not valid as a date since the value for "month" is 61 (1507). In case that the digit sequence is shifted to the left by four digits, "2006/11/10" is generated. This candidate date is valid as a dale (1509). In this way, the valid candidate dates may be stored in the data storage 320, and a plurality of candidate dates may be collectively displayed so as to allow users to select one of the candidates.

As described above, according to the embodiments of the present invention, the complementation operation is performed and the candidate date is generated each time the user inputs one numeral character to input the date, which can minimize the number of times of key input. In addition, the candidate date generated by the complementation operation is displayed to the user each time the user inputs one numeral character. Thus, the user can easily predict the processing of the complementation operation, which allows more efficient date input. A case where input is performed in the date field in a YYYY/MM/DD format in a right-aligned manner has been described as the embodiments of the present invention. However, those skilled in the art can easily understand that input can be performed in other formats, for example, in al MM/DD/YYYY format in a left-aligned manner.

In addition, the present invention can be realized by hardware, software, or a combination of hardware and software. When the present invention is embodied by the combination of hardware and software, an embodiment as a data processing system having a predetermined program can be cited as a typical example. In such a case, the predetermined program is loaded to the data processing system and executed, thereby controlling the data processing system to perform operations according to the embodiments of the present invention. This program may be constituted by a group of instructions representable by a given language, code, or description. Such a group of instructions enables the system to perform specific functions directly or after one of or both of (1) conversion to other languages, codes, or descriptions and (2) copying to other media is performed.

Needless to say, the present invention includes not only such a program itself but also a recording medium having the program recorded thereon within a scope thereof. The program for enabling functions of the present invention to be performed can be stored on any computer-readable recording media, such as a flexible disk, an MO, a CD-ROM, a DVD, a hard disk drive, a ROM, an MRAM, and a RAM. To store such program on a recording medium, the program can be downloaded from other data processing systems connected through a communication network or copied from other media. Additionally, such a program may be stored on one or more recording media after being compressed or divided into a plurality of groups. It should be noted that program products embodying the present invention could be provided in various manner.

It is obvious for those skilled in the art that various modifications or improvements can be added to the above-described embodiments. Accordingly, such modifications or improvements should be included within a technical scope of the present invention.

The invention claimed is:

1. A method for assisting input of a date in a data processing system, wherein
the data processing system performs the steps of:
storing a pre-specified data in a storage device as a reference date;
in response to a user's input of a first digit sequence of one or more digits in a date field displayed on a display device by business computer programs, storing the input first digit sequence in the storage device;
calculating a number of digits n of the input first digit sequence, and comparing said number of digits n with the number of digits m in the date field;
generating a first candidate date by complementing the input first digit sequence with a second digit sequence generated on the basis of the reference date when the calculated number of digits n of the first digit sequence is smaller than the number of digits m in the date field;

incrementing a first value at the $(m-n)^{th}$ digit of the input first digit sequence representing the first candidate date until said first candidate date becomes after the reference date when the first candidate date is before the reference date;

acquiring a third digit sequence representing the reference date from the storage device;

extracting a fourth digit sequence of a number of digits, equivalent to a second value obtained by subtracting the number of digits n of the input first digit sequence from the number of digit m in the date field, from the third digit sequence representing the reference date;

generating a second candidate date by concatenating the extracted fourth digit sequence to the input first digit sequence;

displaying the generated first and second candidate dates on the display device.

2. The method according to claim 1, wherein on condition of specifying that a third candidate date should be generated before the reference date for the date field, the data processing system further performs the steps of:

determining whether or not the concatenated and generated third candidate date is before the reference date; and if the third candidate date is not before the reference date, decrementing a third value at the $(m-n)^{th}$ digit of the first digit sequence representing the third candidate date until said third candidate date becomes before the reference date.

3. The method according to claim 1, the method further including determining whether the generated first candidate date is valid as a date; and displaying that a valid date cannot be generated on the display device when the first candidate date is not valid as a date.

4. The method according to claim 1, the method further including determining whether the generated first candidate date is valid as a date; and generating a third candidate date by performing a complementation operation again on a fifth digit sequence obtained by shifting the input digit sequence by one or more digits in the date field when the third candidate date is not valid as a date.

5. The method according to claim 1, wherein a format of the date field is a YYYYMMDD format, and the input first digit sequence is arranged from the right.

* * * * *